United States Patent [19]

Worden

[11] 4,163,339

[45] Aug. 7, 1979

[54] FISHING LURE

[76] Inventor: R. B. Worden, Box 384, Granger, Wash. 98932

[21] Appl. No.: 876,474

[22] Filed: Feb. 9, 1978

[51] Int. Cl.² ............................................. A01K 83/06
[52] U.S. Cl. ........................................ 43/44.4; 43/44.8
[58] Field of Search .................. 43/44.2, 44.4, 44.8, 43/44.83, 44.87

[56] References Cited

U.S. PATENT DOCUMENTS

| | | | |
|---|---|---|---|
| 2,143,054 | 1/1939 | Copeland | 43/44.4 |
| 2,333,503 | 11/1943 | Worden | 43/44.83 X |
| 2,457,428 | 12/1948 | Worden | 43/44.83 |
| 2,480,042 | 8/1949 | Nelson | 43/44.4 |
| 2,982,049 | 5/1961 | Yost | 43/44.4 |
| 3,196,575 | 7/1965 | Kotis | 43/44.87 |
| 3,736,691 | 6/1973 | Gist | 43/44.8 |
| 3,863,383 | 2/1975 | Lore | 43/44.2 X |

*Primary Examiner*—Nicholas P. Godici
*Attorney, Agent, or Firm*—Seed, Berry, Vernon & Baynham

[57] ABSTRACT

Bait is held to the hook by a loop portion of the leader formed by slidably securing the free end of the leader to the shank of the hook and running the opposite end through the eye of the hook. Beads are placed on the loop portion for pressing against the bait to hold it against the shank of the hook. Beads with rubber or other friction material are held on the leader outside of the hook eye such that the leader can be pulled tight to close the loop portion and be held snugly by the friction beads. Other lure material, spoons, weight, etc. can be added to the lure for producing the desired action.

4 Claims, 2 Drawing Figures

FISHING LURE

BACKGROUND OF THE INVENTION

1. Field of the Invention

This invention pertains to fishing lures and particularly to lures which can more effectively hold bait against the hook shank in an inexpensive and effective manner.

2. Description of the Prior Art

It is commonly known to bait hooks using the conventional technique of piercing the bait with the barb of the hook to hold the bait onto the hook. Some people dislike having to pierce a live bait. Sometimes the bait immediately dies and is less effective as a lure to attract fish. Furthermore, once the bait is pierced it frequently disintegrates and falls off the hook.

One approach to overcoming these shortcomings, namely, to keep the bait more firmly attached to the hook is shown in U.S. Pat. No. 3,748,773. This patent illustrates a metal retainer 16 which is substantially rigid along its length and closes over a bait which has been pierced and threaded onto the hook. Metal retainers undesirably add to the weight of the hook affecting the action of the lure. Furthermore, the retainer being rigid can serve generally only to hold a specialized type of worm type bait onto the hook.

SUMMARY OF THE INVENTION

It is an object of this invention to provide a fishing lure with a simplified bait holding mechanism.

It is another object of this invention to provide a lure which more positively and effectively holds bait to a fishing hook without affecting the action of the lure.

It is another object of this invention to provide a more effective and less expensive fishing lure.

Basically these objects are obtained by connecting the free end of a leader to the shank of a hook between a barb and the eye of the hook, running the opposite or rod end of the leader through the eye to form a loop portion between the shank and the eye, and providing means on the rod end of the leader for holding the loop portion snug against the bait placed between the shank of the hook and the loop portion. In the preferred embodiment the loop portion is provided with beads which are threaded onto the loop portion to reduce the possibility of the loop portion cutting into the bait when the loop portion is pulled tight. In one embodiment the free end of the leader is connected to the shank with a sliding slip knot but a wire ring or other slip type connection can also be used. In one embodiment the loop portion is also knotted on the shank side of the eye to limit the amount of tension that can be applied to the loop portion. In the alternative, however, the knot can pass through the eye for enlarging the loop, if desired, so that bait can be attached outside of the shank. In addition various types of spoons, spinners, beads or other fish attracting devices can be added to the lure if desired.

As is readily apparent, the loop portion when pulled snug will firmly press the bait, such as a worm, against the shank of the hook keeping it from falling free of the hook while fishing. The bait is merely around the shank left alive to have its natural wiggling motions available to attract the fish. Since the bait need not be pierced, it can be applied to the hook very quickly and without damaging the bait. Various types of live bait, such as worms and shrimp or plastic synthetic baits, can be readily attached in this manner. In addition, since the leader is used to secure the bait, it is an inexpensive technique and does not add measurably to the weight or action of the lure. With large bait such as worms the bait acts as a weed guard when held against the shank of the hook to reduce snagging objects in the water or on the bottom. The loop portion can be used on single or triple hooks and works well with clusters of salmon eggs.

Another invention is disclosed is the use of a multiple loop wire clevis for attaching spoons and the like to a fishing line.

DETAILED DESCRIPTION OF THE PREFERRED EMBODIMENTS

Figure 1:
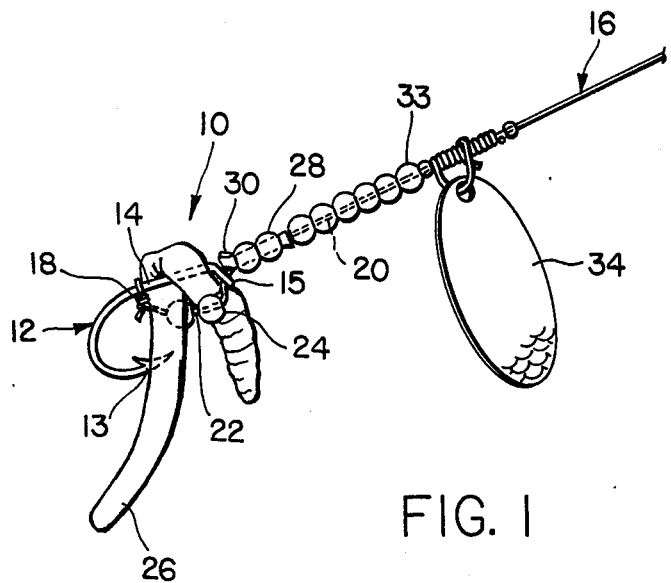
FIG. 1 is an isometric view of one embodiment of a fishing lure embodying the principles of the invention.

As best shown in FIG. 1 the fishing lure 10 comprises a hook 12 having a barb 13, a shank 14 and an eye 15. A leader 16 has a free end secured to the shank preferably with a knot 18 that can slip and move along the shank and an opposite or rod end 20 that is threaded through the eye 15 and extends toward the rod.

Between the eye and the shank the leader forms a loop portion 22. Preferably a pair of beads 24 are threaded on the loop portion to provide body to the loop portion for better gripping a bait, such as worm 26. The rod end of the leader also is provided with beads 28 which are threaded on the leader 16 but which contain a rubber strip 30 or like friction material to provide sufficient friction to hold the beads in a set position on the leader.

In operation the loop portion is enlarged by pulling the leader through the friction or tension beads 28 until a loop is formed large enough to accommodate the bait, for example the worm 26. Preferably then the worm is merely wrapped around the shank with its ends resting against the beads 24. Next the leader is pulled away from the eye while the tension beads 28 are pressed towards the eye. This tightens the loop portion around the bait pressing it against the shank of the hook.

Additional attracting devices such as beads 32 and spoon 34 can be added to enhance the operation of the lure.

Figure 2:
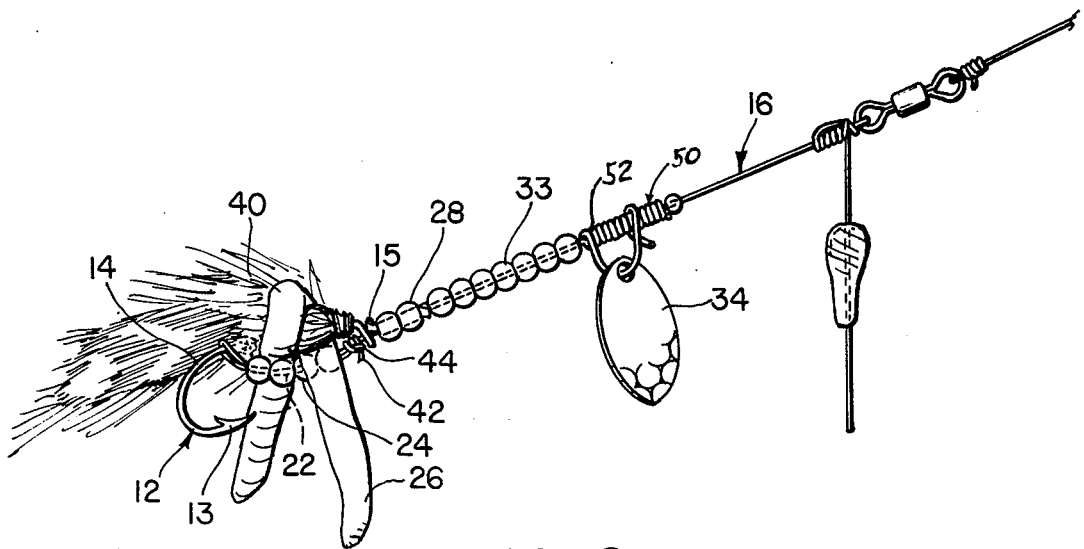
FIG. 2 is a perspective illustration of a second embodiment of a fishing lure illustrating the principles of the invention.

In the second embodiment shown in FIG. 2 a similar hook having a barb 13, a shank 14 and an eye 15 are illustrated. In this embodiment additional lure material such as a fly 40 is tied directly to the shank of the hook. The leader 16 also is provided with a free end 42 having a knot 44. The knot 44 in this embodiment, however, is knotted over the leader after the free end has been looped around the shank 14. Thus the loop of the free end forms a loop portion 22 as in the preferred embodiment. The knot 44 can be designed to abut against the shank end of the eye to limit the tightness which the loop portion can be brought to bear around the bait 26. Beads 24 are again provided to hold the bait against the shank of the hook or, in this case, the fly 40.

As in the preferred embodiment, the tension beads 28 are provided on the rod end of the leader to hold the loop in its set position. Additional beads 33 and the spoon 34 can also be used if desired.

The spoon 34 is uniquely attached to the line 16 by a clevis 50 having a multiple wrap or coil 52 which encircles the line. The multiple wraps are supported by a longer length of line and put less stress on the line during heavy loads as when a heavy fish is hooked. Single loop or wrap type clevises wear the line considerably more during long use unless first smoothed of all burrs or rough surfaces by expensive sanding.

While the preferred embodiments of the invention have been illustrated and described, it should be understood that variations will be apparent to one skilled in the art without departing from the principles herein. Accordingly, the invention is not to be limited to the specific illustrations in the drawing.

I claim:

1. A fishing lure comprising:
a flexible nylon fishing line,
a hook having a shank, a barb at one end of said shank and an eye at the other end of the shank,
means coupling the free end of the line to the shank, the opposite end of said line passing through said eye, the line having a loop portion between said coupling means and said eye movable toward the shank for adjusting the size of the loop portion, and means on said opposite end of the line external of the eye for restricting movement of the line through the eye toward the barb whereby the line can be pulled through the eye to reduce the loop portion on bait adapted to be caught between the shank and loop portion said means for restricting movement of line through the eye including at least one bead abutting the eye and having an opening threaded over the line and a separate friction member within said bead opening engaging the line and the opening for allowing only restricted movement of the line.

2. The lure of claim 1, further including a plurality of beads on said loop portion adapted to press against the bait for precluding the loop portion from cutting into the bait.

3. The lure of claim 1, said coupling means including a knot on the free end of the line slidable along shank for closing the loop portion when the line is pulled through the eye.

4. The lure of claim 1, said friction member including a short piece of rubber resiliently filling said opening for restricting movement of the line.

* * * * *